United States Patent [19]

Chen

[11] 4,012,585
[45] Mar. 15, 1977

[54] INPUT AND OUTPUT FLYING SPOT SCANNING SYSTEM

[75] Inventor: Philip L. Chen, Plano, Tex.

[73] Assignee: Xerox Corporation, Stamford, Conn.

[22] Filed: Feb. 3, 1975

[21] Appl. No.: 546,478

[52] U.S. Cl. .............................. 358/285; 346/108; 358/302
[51] Int. Cl.² ...................... H04N 5/84; H04N 3/08
[58] Field of Search ............... 178/6, 7 R, 7 A, 7.6; 346/76 L, 108; 355/8, 66

[56] References Cited

UNITED STATES PATENTS

| 3,316,348 | 4/1967 | Hufnagel | 178/6.6 R |
| 3,330,181 | 7/1967 | Jakobson | 355/66 |
| 3,465,352 | 9/1969 | Carlson | 346/76 L |
| 3,573,849 | 4/1971 | Herriot | 346/108 |
| 3,752,999 | 8/1973 | Sick | 178/7.6 |
| 3,877,807 | 4/1975 | Kurita | 355/8 |

OTHER PUBLICATIONS

"High-Resolution Graphics Using a Held Laser to Write on Kalvar Film" by Berg et al., July 1974, Journal of the SMPTE, vol. 83, p. 596.

"Laser Raster Scanner", by M. R. Latta, IBM Tech. Disc. Bul., vol. 13, No. 12, May 1971, pp. 3879–3880.
"Laser Raster Scanner With Separated Incident and Reflected Beams", by D. H. McMurtry, IBM Tech. Disc. Bul., vol. 14, No. 8, Jan. 1972, pp. 2460–2461.

*Primary Examiner*—Raymond F. Cardillo, Jr.
*Assistant Examiner*—Alan Faber
*Attorney, Agent, or Firm*—Sheldon F. Raizes

[57] ABSTRACT

A flying spot scanning system is provided which is capable of scanning an unmodulated beam to a reading station for reading a stationary document and a modulated beam to an imaging station for recording an image thereat. The system utilizes optical elements which are common to both the unmodulated beam and the modulated beam to avoid duplication of elements of each beam. The beams strike the same facets of a rotating polygon scanner at the same location so that precise alignment of the facets will not be required. Relatively movable mirrors are moved across a stationary document at the reading station to provide a scan in such a manner to maintain optical conjugates constant.

7 Claims, 3 Drawing Figures

INPUT AND OUTPUT FLYING SPOT SCANNING SYSTEM

DESCRIPTION OF THE INVENTION

This application is related to copending U.S. applications Ser. Nos. 546,476 and 546,477, now U.S. Pat. No. 3,970,359, both of which were filed on Feb. 3, 1975, and are assigned to the same assignee as this application.

It is an object of this invention to provide an apparatus which employs a flying spot scanning system capable of scanning an unmodulated beam to a reading station for reading a stationary document and scanning a modulated beam to an imaging station for recording an image thereat.

It is another object of this invention to design the above scanning system in such a manner to utilize optical elements which are common to both the unmodulated beam and the modulated beam to avoid duplication of elements for each beam.

It is a further object of the invention to design the above scanning system so that the modulated and unmodulated beams strike the same facets of a rotating polygon scanner at the same location or at spaced, vertically aligned locations whereby precise alignment of the facets will not be required.

Yet, it is another object of the invention to include in the above-described scanning system a pair of relatively movable mirrors which are moved across a stationary document at the reading station to provide a scan in such a manner to maintain optical conjugates constant.

Other objects of the invention will become apparent from the following description with reference to the drawings wherein.

Figure 1:
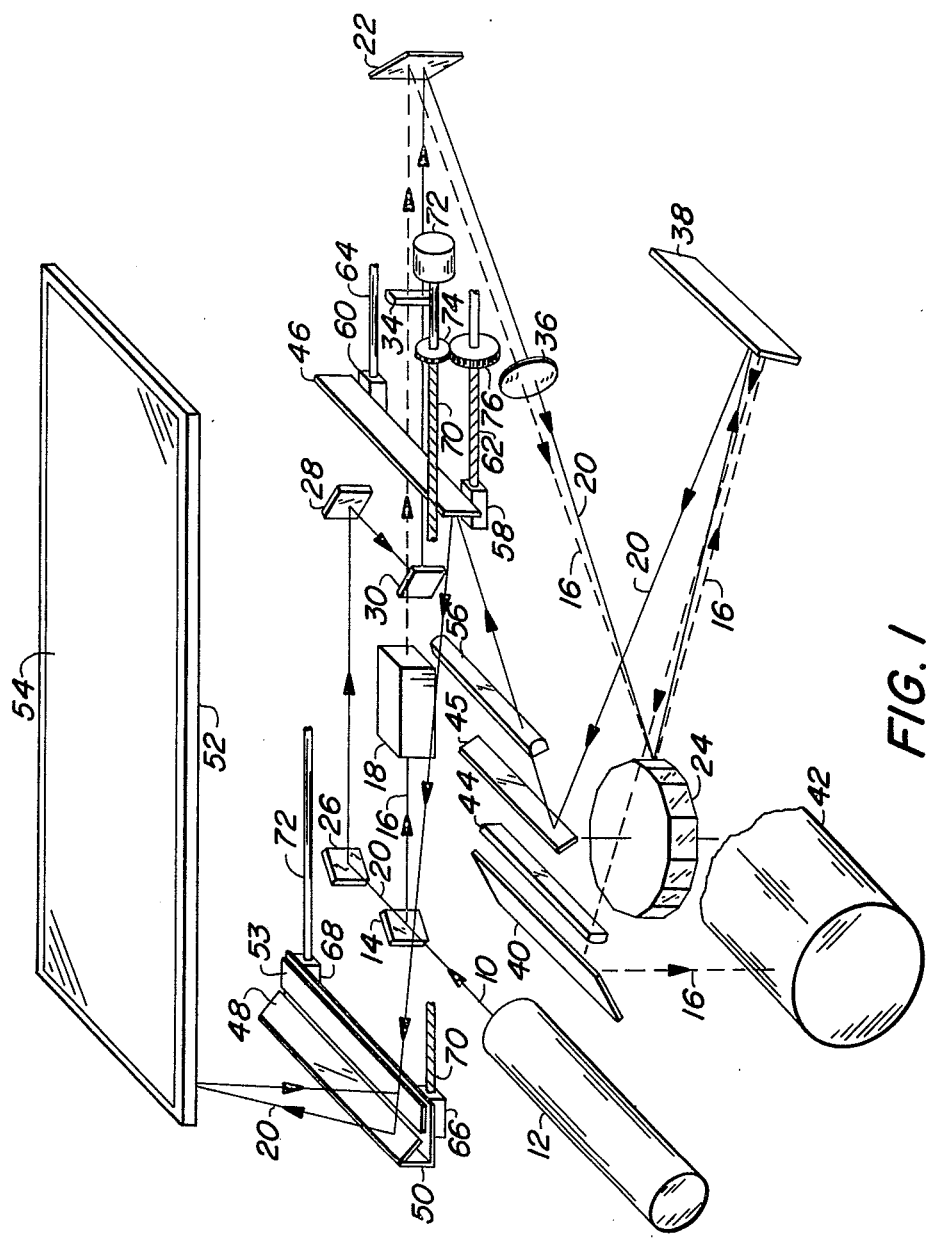
FIG. 1 is an overall view of a flying spot scanning system.

Referring to FIG. 1, a collimated beam 10 is generated by a laser 12. A beam splitter 14 is in the path of the beam 10 and reflects a portion 16 of the beam therefrom to an acousto-optic modulator 18 while also allowing a portion 20 of the beam to pass therethrough as an unmodulated beam. The modulator 18 modulates the beam 16 in conformance with information contained in an electrical signal. The beam portion 20 is reflected slightly downward by a mirror 26 to mirror 28 which reflects the beam 20 to a mirror 30. The mirror 30 is located to reflect the beam 20 to the mirror 22 along a path which is parallel to and vertically aligned with the corresponding portion of the beam 16. In practice, the vertical distance between the beams 20 and 16, where the beams are vertically aligned, is approximately 1/16th of an inch. The modulated beam 16 and the unmodulated beam 20 are reflected by a mirror 22 to a polygon scanner 24 which has a plurality of reflecting facets thereon and scans the beams in an "X" direction perpendicular to the axis of the polygon.

Figure 3:
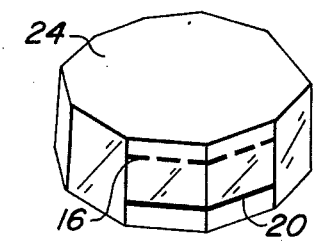
FIG. 3 is a view of a polygon scanner receiving two laser beams.

A cylinder lens 34 is positioned between the mirror 22 and the modulator 18 and in the path of beams 16 and 20 and a spherical imaging lens 36 is located between the mirror 22 and the scanner 24 and in the path of the beams 16 and 20. The cylinder lens 34 has its power plane in the tangential plane which is substantially perpendicular to the axis of rotation of the polygon 24 and acts to expand the beams in the power plane. The beams 16 and 20 are off-axis of the imaging lens 36 resulting in the beams being bent toward each other. The lens 36 is so located to cause the beams 16 and 20 to focus in the sagittal plane on the facets of the polygon and to strike the facets of the polygon at the very same spot to thereby coincide with each other thereat. Normally, the beam width in the scanning direction will be equal to at least the width of two facets. Rather than coincide with each other at the polygon, the beams 16 and 20 may be vertically spaced (in a direction parallel to the axis of polygon rotation) with the width of the beams being axially aligned as shown in FIG. 3.

The modulated beam 16 is reflected from the scanner 24 in a slightly downward direction onto a mirror 38 which is at such an angle to reflect the beam 16 upward above the scanner 24 to a mirror 40 whereby it is redirected to a photosensitive recording medium 42 which may comprise a rotatable drum with a selenium coating. A motor (not shown) may be provided to rotate the drum to provide a Y scan in a direction generally perpendicular to the X scan direction. A cylindrical lens 44 is optically located between the mirrors 38 and 40 in the path of the modulated beam 16 and has its power plane in the sagittal plane which is parallel to the axis of rotation of the polygon 24. The length of each of the mirrors 38 and 40 and the cylindrical lens 44 is substantially equal to the width of the recording surface of the drum 42 to allow a full X scan thereacross. The cylinder lens 34 and the imaging lens 36 act in conjunction to focus the beam 16, in the tangential plane, within a depth of focus located on the surface of the drum 42. The imaging lens 36 and the cylinder lens 44 act in conjunction to focus the beam 16, in the sagittal plane, within a depth of focus located on the surface of drum 42.

The modulated beam 16 imposes a latent image on the recording drum 42 in accordance with information transmitted to the modulator 18 as the beam is scanned in the X direction across the drum by the scanner 24. The latent image is developed with toner particles by any well-known xerographic method and the developed image is transferred to a copy medium by any well-known method to provide a hard copy of the information. The driving means (not shown) for the scanner, the motor (not shown) for the drum 42 and the modulator may all be synchronized in any well-known manner.

The unmodulated beam 20 is reflected slightly upward from the scanner 24 onto the mirror 38 whereby it is directed upward above the scanner to a mirror 45 which is at such an angle to redirect the beam 20 upward to a movable mirror 46. The mirror 46 is so positioned to reflect the beam 20 upward to another mirror 48 which is mounted on a movable carrier 50. The mirror 48 directs the beam 20 to a stationary platen 52 which is adapted to hold a document 54 thereon. A strip diode 53 is mounted on the carrier 50 and is arranged to receive diffuse beam reflections from the document 54 and to convert the variation in intensity of the reflections into electrical signals which represent the information on the document 54.

A cylinder lens 56 is located between the mirrors 45 and 46 and in the path of the unmodulated beam 20. The power plane of the cylinder lens 56 is in the sagittal plane. The length of each of the mirrors 38, 45, 46 and 48 and the lens 56 is substantially equal to the width of the platen to allow full X scan thereacross. The cylinder lens 34 in conjunction with the imaging lens 36 acts to focus the beam 20, in the tangential plane, within a depth of focus which lies on the top surface of the platen 52. The imaging lens 36 and the cylinder lens 56 act in conjunction to focus the beam 20, in the sagittal plane, within a depth of focus which also lies on the top surface of the platen 52.

Figure 2:
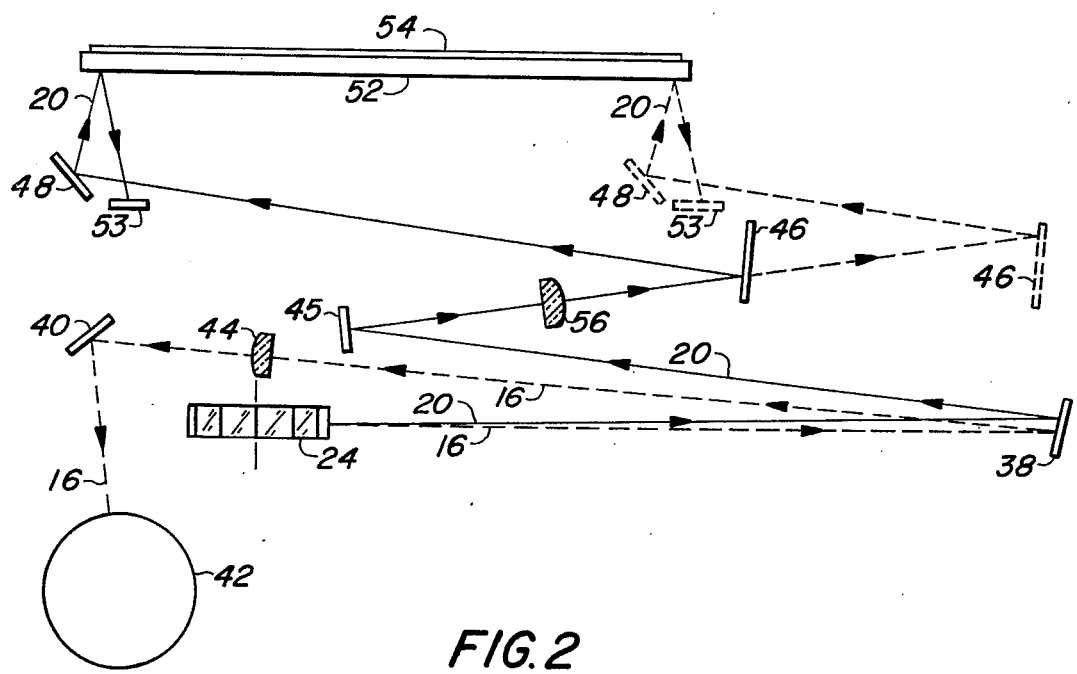
FIG. 2 is a partial side view of the system shown in FIG. 1.

The mirror 46 is fixed to a pair of blocks 58 and 60 through which a worm shaft 62 and a fixed guide rod 64 extend, respectively. The carrier 50 has a pair of blocks 66 and 68 fixed thereto. The blocks 66 and 68 receive a worm shaft 70 and a fixed guide rod 72 therethrough, respectively. The worm shaft 70 is driven by a reversible motor 72 and is interconnected to the worm shaft 62 by intermeshing gears 74 and 76. The gear 74 is fixed to the shaft 70 and is smaller than the gear 76 which is fixed to the shaft 62. Rotation of the worm shafts 62 and 70 will cause movement of the mirrors lengthwise of the platen for scanning the document 54 in a Y direction which direction is along the length of the document. The carrier 50 is moved in a direction toward mirror 46 for a total distance equal to the length of the platen and mirror 46 is moved in the same direction for a total distance of ½ the total distance carrier 50 moves, which moves, which movement is illustrated in phantom in FIG. 2. The gear ratio is such that the shaft 70 will rotate faster than the shaft 62 to the extent that the carrier 50 will move in a direction toward the mirror 46 at a rate which is twice as fast as the mirror 46 has moved in the same direction. This relative rate of movement between the mirrors will keep the beam distance constant between the polygon 24 and the platen 52 which will maintain the optical conjugates constant thereby permitting the lenses 34, 36 and 56 to be stationary. The motor 72 is synchronized with the scanner 24 by well-known means. Scanning of the document 54 across the width of the document is provided by the polygon 24.

When it is desired to scan the document 54, the motor 72 is energized to actuate the worm shafts 62 and 70 to move the carrier 50 and mirror 46. The beam 12 is scanned by the polygon 24 across the length of the mirrors 38, 45, 46 and 48 and thereby across the width of the document 54 to effect a scan in the X direction as the mirror 48 traverses the length of the document 54 to effect a scan of successive increments thereof in the Y direction. The mirror 46 moves at ½ the rate of the carrier 50 to maintain the optical conjugates constant. The diffuse reflections from the document are directed to the strip diode 53 where the variations in intensity, representing background and image areas, are converted to electrical information signals.

In order to transmit equal beam spot sizes to the top surface of the platen 52 and the surface of drum 42, the surfaces are optically equally distant from the beam reflecting facet of the polygon 24 and the cylindrical lenses 44 and 56 are also equally distant from the beam reflecting facet of the polygon 24.

The two stations, i.e., a document station and the photosensitive drum, may be designed to operate in several combinations of functions. For instance, the document 54 can be read and the signals from the strip diode 53 transmitted to a remote recorder for producing a copy in accordance with the signals or the signals can be utilized to control modulator 18 to produce a reproduction of the document 54 on the photosensitive drum 42, or both, simultaneously. The modulator 18 may also be controlled by a computer or a remote data source. The computer may receive its information from a tape or the strip diode 53 may send information to a buffer which stores the information and interfaces with the computer when the computer requests information therefrom. Each station can be designed to be selectively addressed simultaneously or separately. Each of these functions can be carried out by providing suitable circuits which permit selective actuations of the various driving means for driving the drum 42 or the mirrors 46 and 48. Furthermore, solenoid operated shutter mechanisms (not shown) may be placed in the path of beam portions 16 and 20 to either block its respective beam or allow the same to pass to its respective station. Again, suitable circuits can be designed to selectively operate the individual shutters as desired.

It should be noted that the above-described system utilizes lenses 34 and 36, the polygon 24 and mirrors 22 and 38 which are common to both the modulated and unmodulated beams 16 and 20 thus reducing unnecessary duplication thereof for the separate beams. Both beams strike the same facets of the polygon at the very same areas or in vertical alignment with each other allowing simple scanning synchronization of the beams, thus requiring less stringent manufacturing tolerances than if the separate beams were directed to separate facets which would then require that the facets be much more precisely aligned with each other. The flat field scanning system for reading the document 54 maintains the optical conjugates constant thus allowing the lenses to be stationary. Therefore, it can be seen that the scanning system provided has achieved the aforementioned objects in a very simple and inexpensive manner.

While both beams are shown generated by a single laser source, it should be appreciated that separate laser sources could be utilized to generate separate beams. Also, the beam splitter 16 could be eliminated by utilizing a laser which generates separate beams from the front and rear ends, such as the laser 10 depicted in U.S. Pat. No. 3,316,348. In each case, suitable means can be utilized to direct the separate beams to the same spot on the polygon 24.

What is claimed is:

1. In a flying spot scanning system: an illumination source generating a collimated beam, a beam splitter in the path of the collimated beam permitting a portion of the collimated beam to pass therethrough and redirecting another portion of the collimated beam, a modulator located between said beam splitter and a rotatable polygon scanner in the path of one of said beam portions to modulate the same to provide a modulated beam, the other of said beam portions being an unmodulated beam, an imaging station, a reading station, means for directing each said beam along separate paths to said polygon and including a first cylinder lens and an imaging lens optically located between said polygon and said first cylinder lens, said first cylinder lens and said imaging lens being located in the path of each of said beams, said first cylinder lens being optically located between said beam splitter and said polygon, the width of each beam in the direction of scan at the polygon being substantially the same, said beams being aligned on said polygon in a direction parallel to the axis of rotation, said directing means directing said beams to said polygon along such paths that said beams will reflect from said polygon along separate paths, said imaging station being in the path of the modulated beam reflected from said polygon, a second cylinder lens being optically located between said polygon and said imaging station in the path of said modulated beam, said reading station being in the path of the unmodulated beam reflected from said polygon, a first mirror optically located between said polygon and said reading station, a second mirror optically located between said first mirror and said reading station, said first mirror being in the path of said scanned unmodulated beam, said first mirror reflecting said unmodulated beam to said second mirror, said second mirror reflecting said unmodulated beam to said reading station, each of said mirrors extending across said reading station in the direction of beam scan whereby the unmodulated beam will be scanned across said document station in an X direction, means mounting said first and second mirrors for movement in a Y direction transverse to said X direction, means for simultaneously moving said second mirror in said Y direction across substantially the full length of said document station and for moving said first mirror in the same direction as said second mirror is moved a distance substantially less than the distance said second mirror is moved, the relative distance of and the relative rate of movement of said mirrors being such to maintain the unmodulated beam length between said polygon and said reading station substantially constant, and means for detecting reflection of said unmodulated beam from said reading station, a third cylinder lens optically located between said reading station and said polygon in the path of said scanned unmodulated beam, said first cylinder lens having its power plane in a plane generally perpendicular to the axis of rotation of said polygon, said second and third cylinder lenses each having its power plane in a plane generally parallel to the axis of rotation of said polygon and each being equally optically spaced from said imaging lens.

2. The scanning system of claim 1 wherein said third cylinder lens is optically located between said polygon and said first mirror.

3. The scanning system of claim 2 wherein a mirror is optically located between said polygon and said imaging station and in the path of the modulated beam reflected from said polygon for directing the same to said imaging station, said second cylinder lens being optically located between said last named mirror and said polygon.

4. The scanning system of claim 1 wherein said beams are coincident on said polygon.

5. The scanning system of claim 1 wherein said beams are spaced from each other on said polygon in a direction parallel to the axis of rotation of said polygon.

6. The scanning system of claim 1 wherein said third cylinder lens is optically located between said polygon and said first mirror.

7. The scanning system of claim 6 wherein a mirror is optically located between said polygon and said imaging station and in the path of the modulated beam reflected from said polygon for directing the same to said imaging station, said second cylinder lens being optically located between said last named mirror and said polygon.

* * * * *